(12) United States Patent
Buley et al.

(10) Patent No.: US 9,174,576 B2
(45) Date of Patent: Nov. 3, 2015

(54) EMERGENCY RELEASE BRACKET SYSTEM

(71) Applicants: Gloria Buley, Shokan, NY (US); Richard Harlan Yinko, Jr., Sheboygan, WI (US); Reid Justin Yinko, Sheboygan, WI (US)

(72) Inventors: Gloria Buley, Shokan, NY (US); Richard Harlan Yinko, Jr., Sheboygan, WI (US); Reid Justin Yinko, Sheboygan, WI (US)

(73) Assignee: WOODSTOCK TRANSPORATION COMPONENTS, INC., Scarsdale, NY (US)

( * ) Notice: Subject to any disclaimer, the term of this patent is extended or adjusted under 35 U.S.C. 154(b) by 0 days.

(21) Appl. No.: 13/663,217

(22) Filed: Oct. 29, 2012

(65) Prior Publication Data
US 2013/0112835 A1    May 9, 2013

Related U.S. Application Data

(60) Provisional application No. 61/555,917, filed on Nov. 4, 2011.

(51) Int. Cl.
| | | |
|---|---|---|
| *A47G 1/24* | (2006.01) | |
| *B60R 1/00* | (2006.01) | |
| *B60R 11/00* | (2006.01) | |
| *B60Q 1/50* | (2006.01) | |
| *B60R 1/078* | (2006.01) | |
| *B60R 21/00* | (2006.01) | |
| *B60Q 1/26* | (2006.01) | |

(52) U.S. Cl.
CPC .............. *B60R 1/008* (2013.01); *B60Q 1/2692* (2013.01); *B60Q 1/50* (2013.01); *B60R 1/078* (2013.01); *B60R 11/00* (2013.01); *B60R 21/00* (2013.01); *B60R 2021/0027* (2013.01); *B60R 2021/0067* (2013.01)

(58) Field of Classification Search
CPC ....... E01F 9/0126; B60R 1/008; B60R 11/00; G09F 21/04

USPC ................ 40/643, 661.06, 584, 591, 606.14, 40/606.15, 417, 423, 564, 900; 248/223.21, 225.11, 572, 220.22, 248/220.31, 220.43, 223.31, 224.8, 200, 248/220.42, 222.51, 221.12, 476, 222.13, 248/222.14, 222.12, 220.41, 220.21; 312/245, 204, 265.5, 265.6; 340/433; 108/28, 29, 108; 224/673, 317, 511, 224/585, 400, 401, 488, 492, 494, 500, 513, 224/517

See application file for complete search history.

(56) References Cited

U.S. PATENT DOCUMENTS

| | | | | |
|---|---|---|---|---|
| 5,355,117 | A | * | 10/1994 | Jefferson .................... 340/425.5 |
| 5,406,250 | A | * | 4/1995 | Reavell et al. ................. 340/433 |
| 7,233,259 | B2 | * | 6/2007 | Gibson et al. ................. 340/907 |
| 7,677,400 | B2 | * | 3/2010 | Bayazit et al. ................... 211/26 |
| 2011/0278409 | A1 | * | 11/2011 | Ota et al. .................. 248/231.91 |

* cited by examiner

*Primary Examiner* — Kimberly Wood
(74) *Attorney, Agent, or Firm* — McAndrews, Held & Malloy, Ltd.

(57) ABSTRACT

Certain embodiments provide emergency release bracket systems for use in connection with vehicle signage. The emergency release bracket system includes a mounting bracket for operably connecting to a vehicle. The mounting bracket includes bent out tabs and mounting plate attachment holes. The emergency release bracket system includes a mounting plate for operably connecting to vehicle signage. The mounting plate includes tab windows and tab slots. The mounting plate is adjustably and detachably coupled to the mounting bracket by mating the tab windows of the mounting plate with a portion of the bent out tabs of the mounting bracket. The mounting plate is secured to the mounting bracket using removable couplings extending through the tab slots of the mounting plate and the mounting plate attachment holes of the mounting bracket.

12 Claims, 10 Drawing Sheets

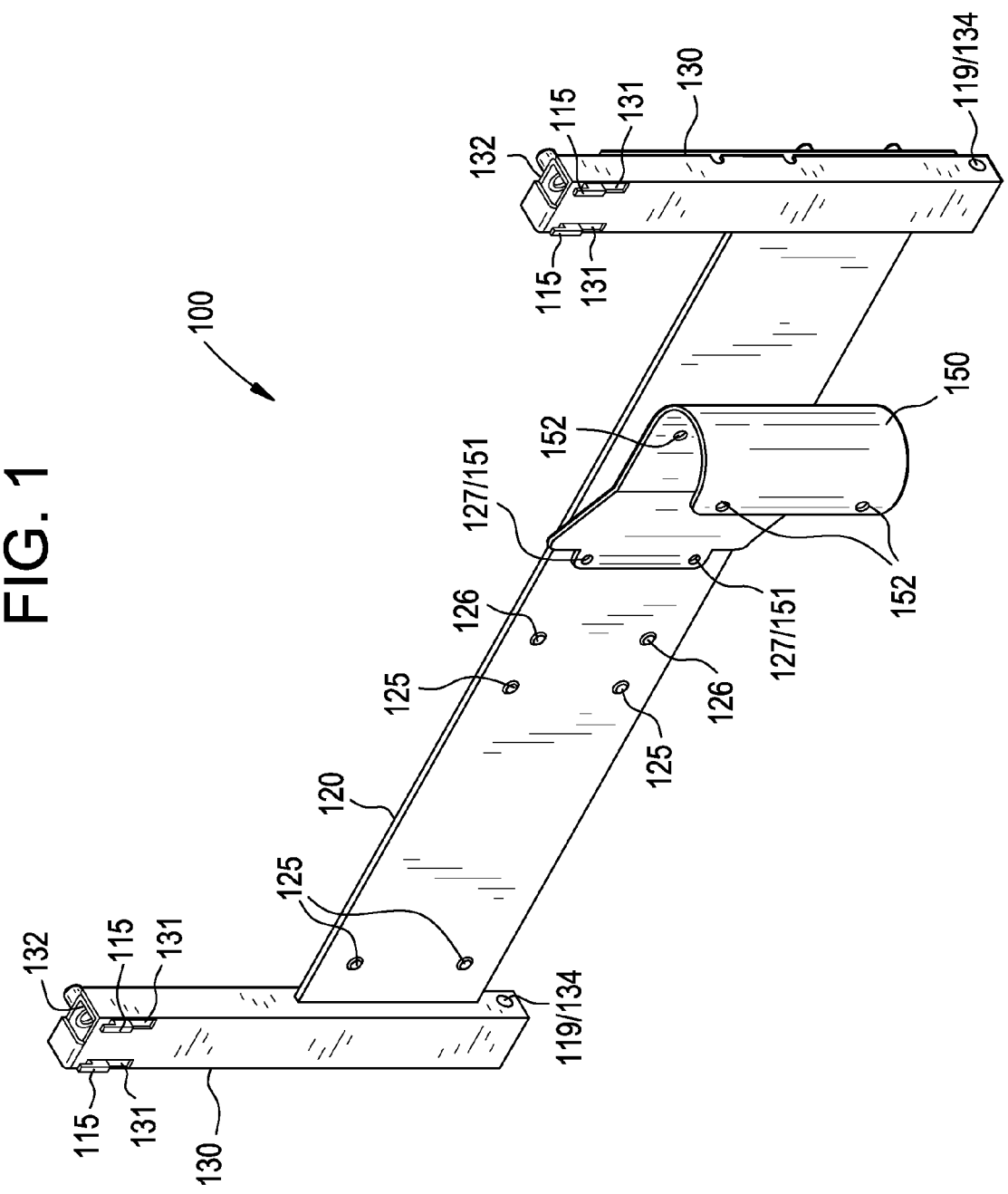

EMERGENCY RELEASE BRACKET SYSTEM

CROSS-REFERENCE TO RELATED APPLICATIONS

Incorporation by Reference

This patent application makes reference to, claims priority to and claims benefit from U.S. Provisional Patent Application Ser. No. 61/555,917, entitled "Emergency Release Bracket System," filed on Nov. 4, 2011, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

FIELD OF INVENTION

Certain embodiments of the invention relate to emergency release bracket systems for use in connection with vehicle signage. More specifically, certain embodiments of the invention relate to bracket systems for adjustably and detachably mounting vehicle signage to the outside of a school bus such that: (1) the vehicle signage may be mounted at various heights over windows of various widths, and (2) rescue personnel may remove, without using tools, the vehicle signage from the outside of the school bus to access a window of the school bus.

BACKGROUND OF THE INVENTION

Signage configured to be extended from a side of a vehicle, such as a stop sign and/or mirror configured to be extended from a side of school bus, for example, requires a mounting system for attaching to the vehicle. Such mounting system should allow the vehicle signage to be mounted on various vehicle models. It is also desirable that such mounting system should allow the vehicle signage to be mounted at various heights so that the use of the vehicle signage is optimized. Further, the vehicle signage should be removable, without using tools, such that rescue personnel may remove the vehicle signage in an emergency situation.

For example, a stop sign and mirror assembly configured to be extended from a passenger side of school bus may be used to provide visibility near the right rear tire of the school bus and to alert automobiles that passing is illegal. As such, an optimal position for mounting the stop sign and mirror assembly may be toward the rear of the bus and at a height of one of the rear school bus windows. A mounting system should be adjustable to the width of windows on different bus models. Further, in order to meet the visibility requirements of the Federal Motor Vehicle Safety Standard 571.111, the mounting system should allow for height adjustment of the stop sign and mirror assembly. In order for rescue personnel to have access to all windows of the school bus in the event of an emergency, the stop sign and mirror assembly should be removable without needing to use tools.

Known mounting systems are ineffective for adjustably and detachably mounting vehicle signage to the outside of a vehicle. Thus, improved bracket systems are desirable.

Further limitations and disadvantages of conventional and traditional approaches will become apparent to one of skill in the art, through comparison of such systems and methods with the present invention as set forth in the remainder of the present application with reference to the drawings.

BRIEF SUMMARY OF THE INVENTION

An apparatus is provided for emergency release bracket systems for use in connection with vehicle signage, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWING(S)

FIG. 1 is a perspective view of an exemplary mounting bracket assembly used in accordance with an embodiment of the present technology.

Figure 2A:
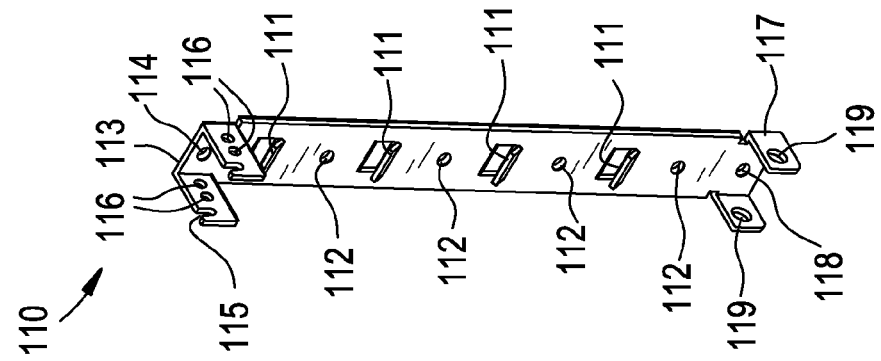
FIG. 2A is a diagram (front view) of an exemplary mounting bracket used in accordance with an embodiment of the present technology.

The foregoing summary, as well as the following detailed description of embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF PREFERRED EMBODIMENT(S)

Embodiments of the present technology provide emergency release bracket systems for use in connection with vehicle signage.

Certain embodiments provide emergency release bracket systems 100 for use in connection with vehicle signage 200. The emergency release bracket system 100 includes a mounting bracket 110 for operably connecting to a vehicle. The mounting bracket 110 includes bent out tabs 111 and mounting plate attachment holes 112. The emergency release bracket system 100 includes a mounting plate 120 for operably connecting to vehicle signage 200. The mounting plate 120 includes tab windows 121, 123 and tab slots 122, 124. The mounting plate 120 is adjustably and detachably coupled to the mounting bracket 110 by mating the tab windows 121, 123 of the mounting plate 120 with a portion of the bent out tabs 111 of the mounting bracket 110. The mounting plate 120 is secured to the mounting bracket 110 using removable couplings extending through the tab slots 122, 124 of the mounting plate 120 and the mounting plate attachment holes 112 of the mounting bracket 110.

Figure 2B:
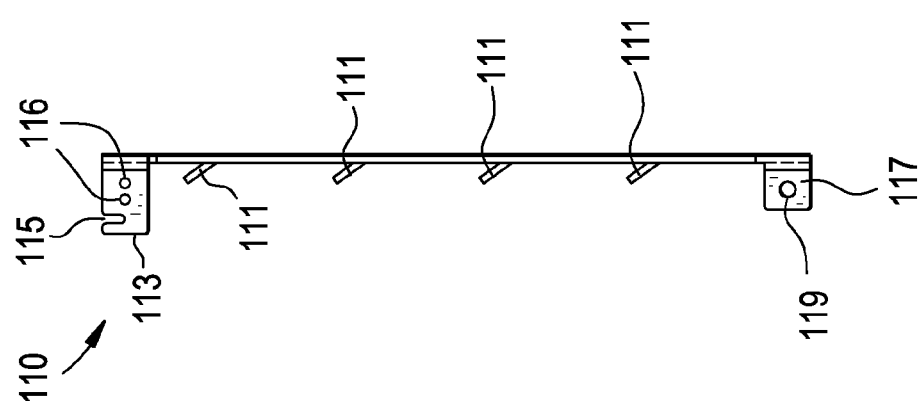
FIG. 2B is a diagram (side view) of an exemplary mounting bracket used in accordance with an embodiment of the present technology.
Figure 2C:
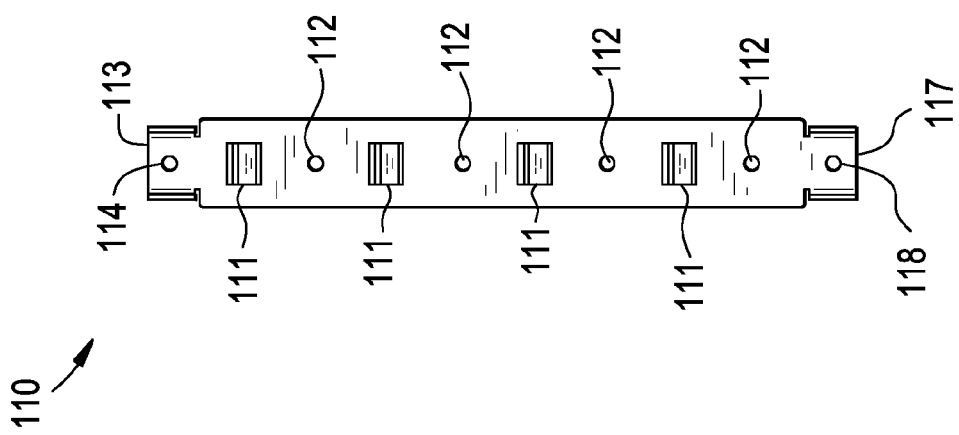
FIG. 2C is a perspective view of an exemplary mounting bracket used in accordance with an embodiment of the present technology.
Figure 3:
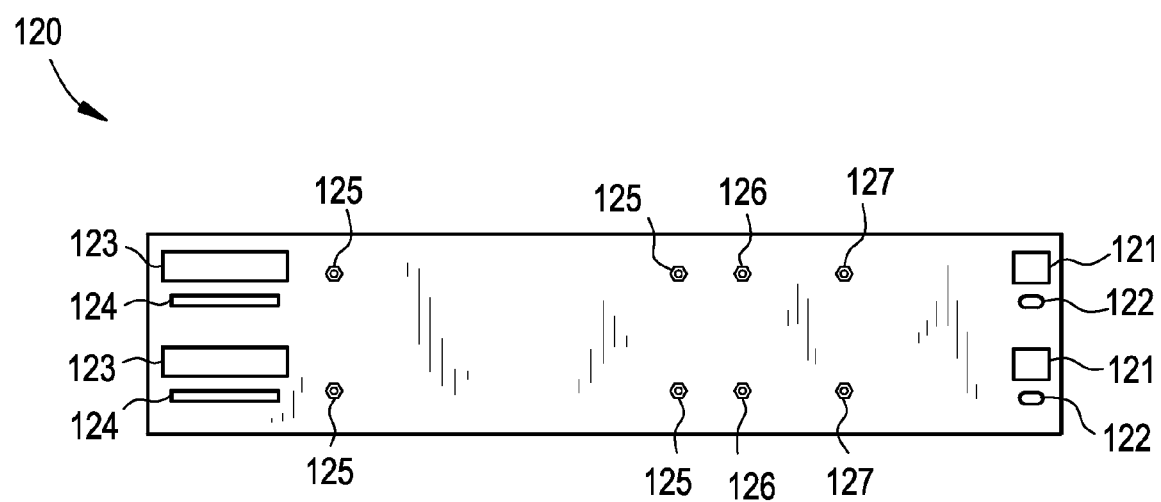
FIG. 3 is a diagram (front view) of an exemplary mounting plate used in accordance with an embodiment of the present technology.
Figure 4C:
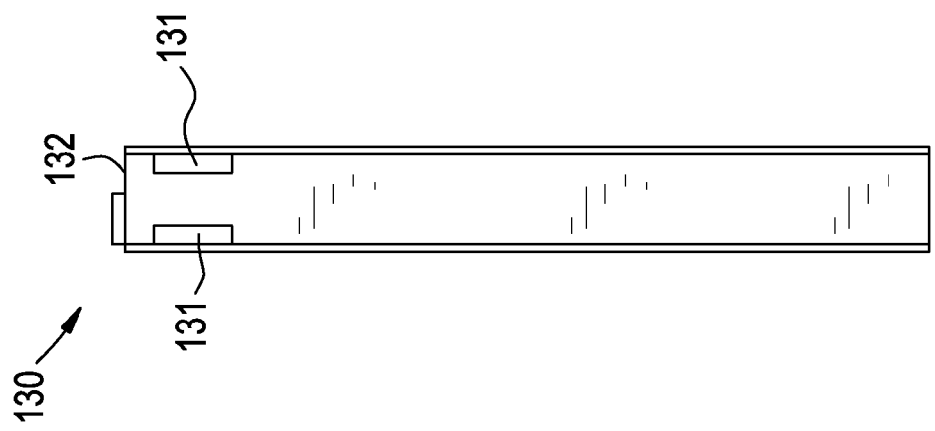
FIG. 4C is a perspective view of an exemplary mounting bracket cover used in accordance with an embodiment of the present technology.
Figure 4B:
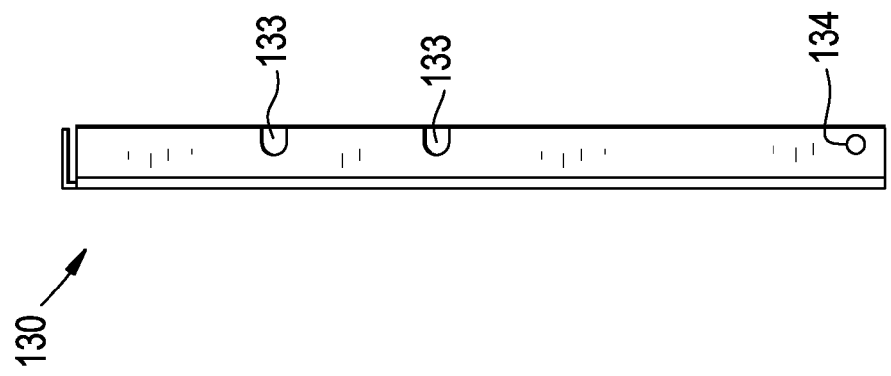
FIG. 4B is a diagram (side view) of an exemplary mounting bracket cover used in accordance with an embodiment of the present technology.
Figure 4A:
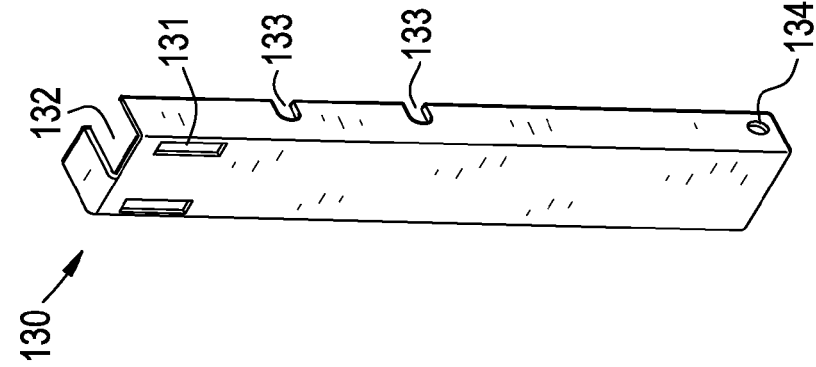
FIG. 4A is a diagram (front view) of an exemplary mounting bracket cover used in accordance with an embodiment of the present technology.
Figure 5:
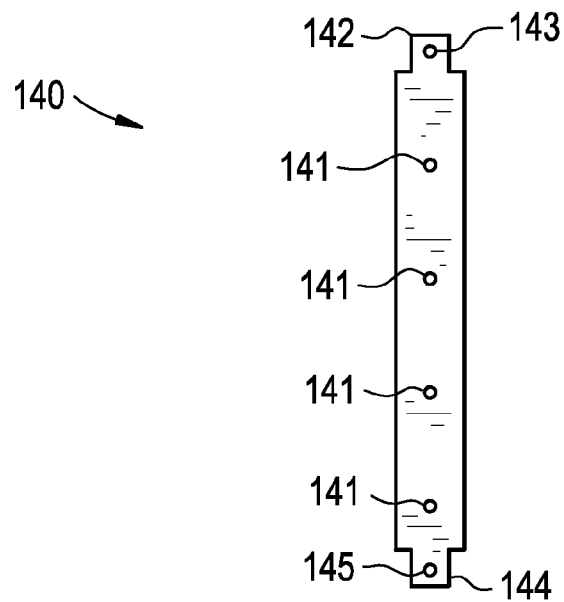
FIG. 5 is a diagram (front view) of an exemplary mounting bracket gasket used in accordance with an embodiment of the present technology.
Figure 6:
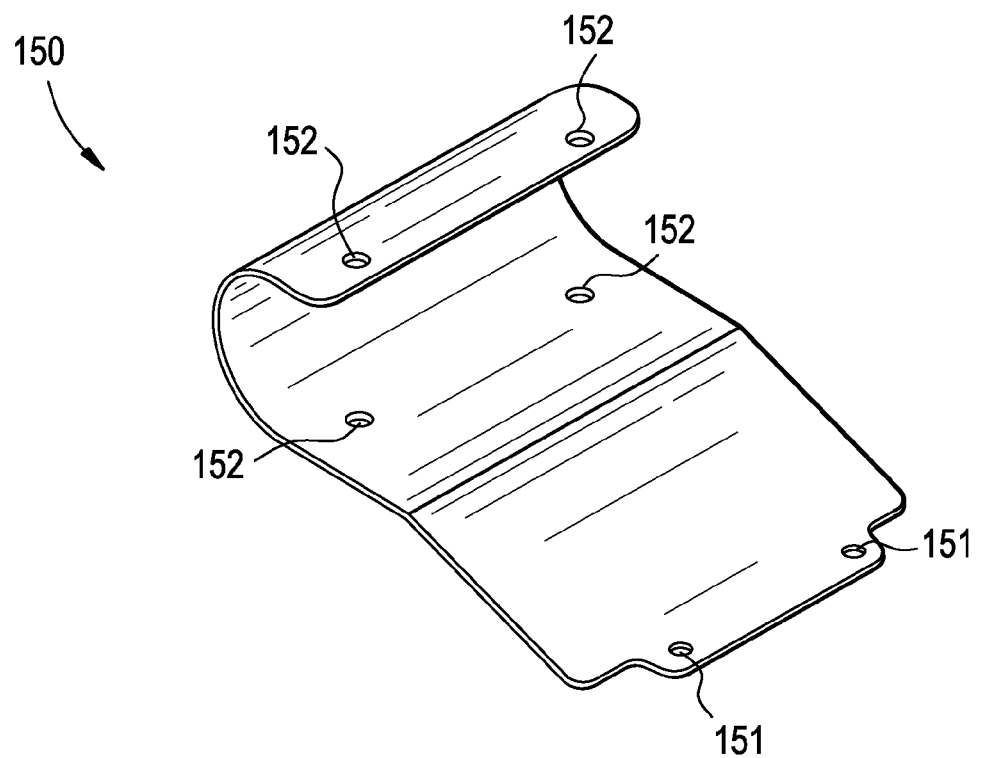
FIG. 6 is a perspective view of an exemplary bullet nose bracket used in accordance with an embodiment of the present technology.

FIG. 1 is a perspective view of an exemplary mounting bracket assembly used in accordance with an embodiment of the present technology. FIGS. 2A-2C illustrate front, side and perspective views of an exemplary mounting bracket. FIG. 3 is a diagram (front view) of an exemplary mounting plate. FIGS. 4A-4C illustrate front, side and perspective views of an exemplary mounting bracket cover. FIG. 5 is a diagram (front view) of an exemplary mounting bracket gasket. FIG. 6 is a perspective view of an exemplary bullet nose bracket.

In various embodiments, the mounting bracket assembly 100 comprises mounting brackets 110 (as illustrated in FIGS. 2A-2C and 10-11), mounting plate 120 (as illustrated in FIGS. 1, 3, 7-9 and 11), and mounting bracket covers 130 (as illustrated in FIGS. 1, 4A-4C and 7-11). Mounting brackets 110 are operably connected to a side of a vehicle. For example, rivet nuts, among other things, may be installed on both sides of a rear school bus window and bolts or the like may extend through vehicle mounting holes 114, 118 such that a mounting bracket 110 may attach flush to the school bus and perpendicular to the ground on both sides of the school bus window. In various embodiments, a mounting bracket gasket 140, as illustrated in FIG. 5, may be used between the mounting brackets 110 and the vehicle to minimize vibrations and prevent damage to the vehicle (e.g., paint damage, among other things). In certain embodiments, the mounting bracket assembly 100 comprises a bullet nose bracket 150. The bullet nose bracket 150 may be generally J-shaped and can be operable to protect vehicle signage 200 from damage from wind, tree limbs, debris and the like while the vehicle is moving and the vehicle signage 200 is in a closed position, as illustrated in at least FIG. 7, for example.

Referring to FIGS. 2A-2C, certain embodiments provide that the mounting brackets 110 comprise bent out tabs 111 and mounting plate attachment holes 112. The mounting brackets 110 comprise a top portion 113 and a bottom portion 117. The top portion 113 can comprise vehicle mounting hole(s) 114, notch(es) 115 and cable securing hole(s) 116. The bottom portion 117 may comprise vehicle mounting hole(s) 118 and mounting bracket cover attachment hole(s) 119. The mounting bracket 110 may attach flush to a vehicle and perpendicular to the ground on both sides of a vehicle window by securing bolts or the like through vehicle mounting holes 114, 118 and into the vehicle. The mounting brackets 110 may be a rigid material, such as metal, or any other suitable material.

Referring to FIG. 3, mounting plate 120 comprises tab windows 121, tab slots 122, extended tab windows 123, extended tab slots 124, vehicle signage mounting holes 125, wind guard mounting holes 126, and bullet nose bracket mounting holes 127. The mounting plate 120 may be a rigid material, such as metal, or any other suitable material.

Mounting plate 120 is operably connected to mounting brackets 110 by coupling bent out tabs 111 of mounting brackets 110 with tab windows 121 and extended tab windows 123 of mounting plate 120. Further, mounting plate 120 is secured to mounting brackets 110 by using removable knobs, thumb screws, or any other suitable attachment mechanism to extend through tab slots 122 and extended tab slots 124 of mounting plate 120 and mounting plate attachment holes 112 of mounting brackets 110.

For example, mounting brackets 110 may be installed on both sides of a vehicle window. The mounting plate 120 may be operably connected to mounting brackets 110 at a selectable height. As an example and in reference to FIGS. 2A-2C, six bent out tabs 111 are illustrated, although more or less bent out tabs 111 may be included on mounting bracket 110. A highest height may be selected by coupling tab windows 121 and extended tab windows 123 to the top two bent out tabs 111. A middle height may be selected by coupling tab windows 121 and extended tab windows 123 to the middle two bent out tabs 111. A lowest height may be selected by coupling tab windows 121 and extended tab windows 123 to the lowest two bent out tabs 111. After a preferred height is selected and the mounting plate 120 is operably connected to mounting brackets 110, the mounting plate 120 is secured to the mounting brackets by extending any suitable removable couplings through tab slots 122 and extended tab slots 124 of mounting plate 120 and mounting plate attachment holes 112 of mounting brackets 110. In certain embodiments, the removable couplings used to secure the mounting plate 120 to the mounting brackets 110 would not require tools to remove.

The extended tab windows 123 and extended tab slots 124 allow the mounting bracket assembly 100 to be used at variable widths. For example, in reference to school buses, different school bus models may have different window widths. As such, the distance between mounting brackets 110 installed on both sides of a school bus window may vary for different school bus models. The extended tab windows 123 and extended tab slots 124 provide a width range between mounting brackets 110 for using the mounting bracket assembly 100.

Figure 11:
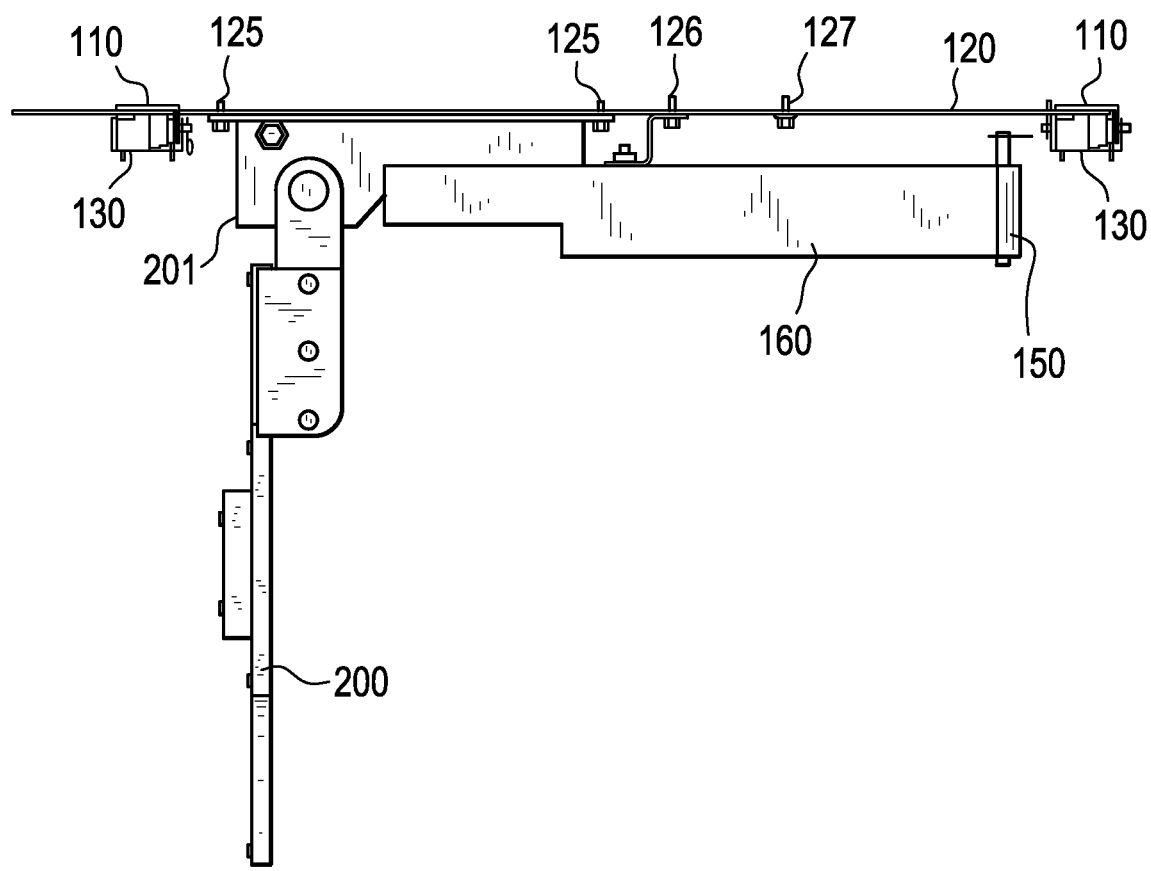
FIG. 11 is a top view of an exemplary mounting bracket assembly coupled to vehicle signage in an open position used in accordance with an embodiment of the present technology.

A bullet nose bracket 150, as illustrated in FIG. 5 and discussed in more detail below, may be operably connected to mounting plate 120 by bolts, screws, or any suitable attachment mechanism, extending through mounting plate attachment holes 151 and bullet nose bracket mounting holes 127. A wind guard 160 may operably connected to mounting plate 120. In various embodiments, wind guard 160 is operably connected to mounting plate 120 using a bracket, such as a z-bracket or any other suitable bracket, as illustrated in FIG. 11. For example, bolts, screws, or any other suitable attachment mechanism, may extend through mounting plate attachment holes 161 and attach to the bracket. Further, bolts, screws, or any other suitable attachment mechanism, may extend through wind guard mounting holes 126 and attach to bracket.

Figure 7:
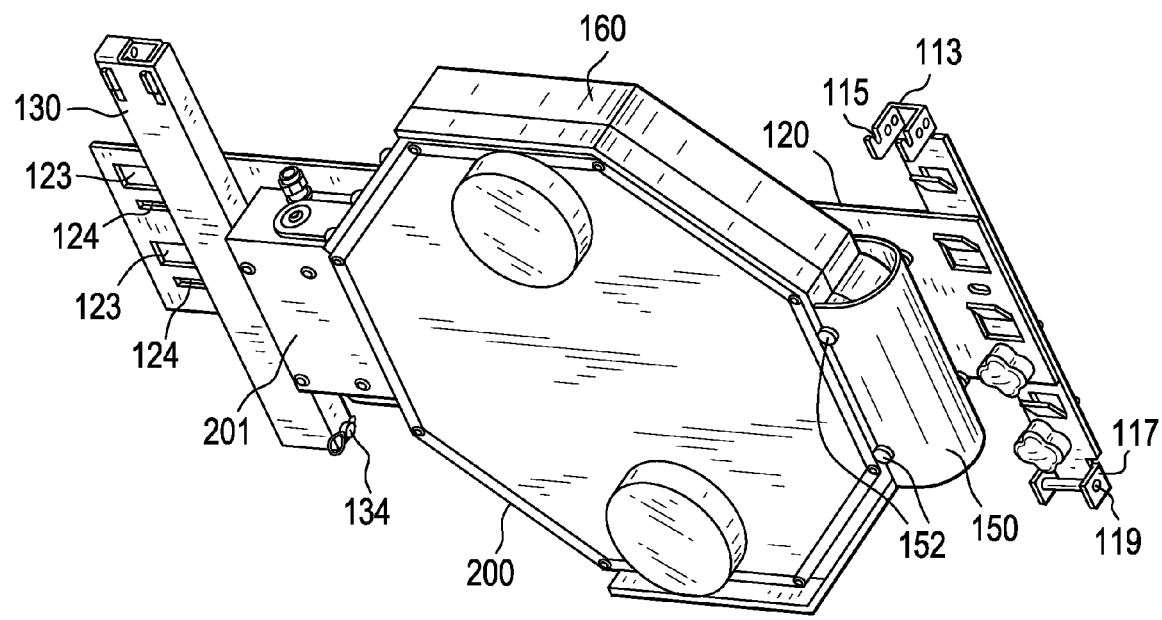
FIG. 7 is a perspective view of an exemplary mounting bracket assembly coupled to vehicle signage in a closed position used in accordance with an embodiment of the present technology.
Figure 8:
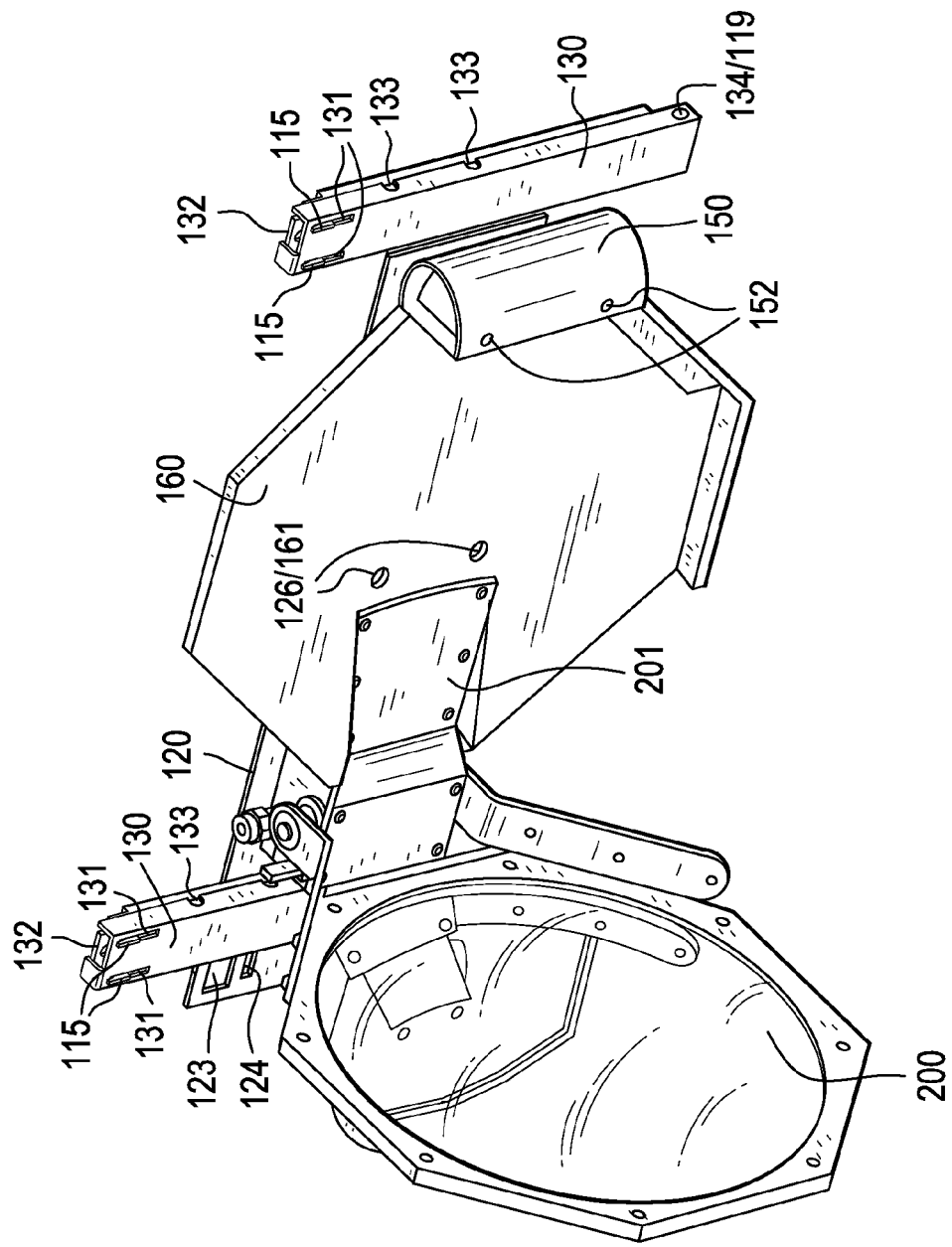
FIG. 8 is a perspective view of an exemplary mounting bracket assembly coupled to vehicle signage in an open position used in accordance with an embodiment of the present technology.
Figure 9:
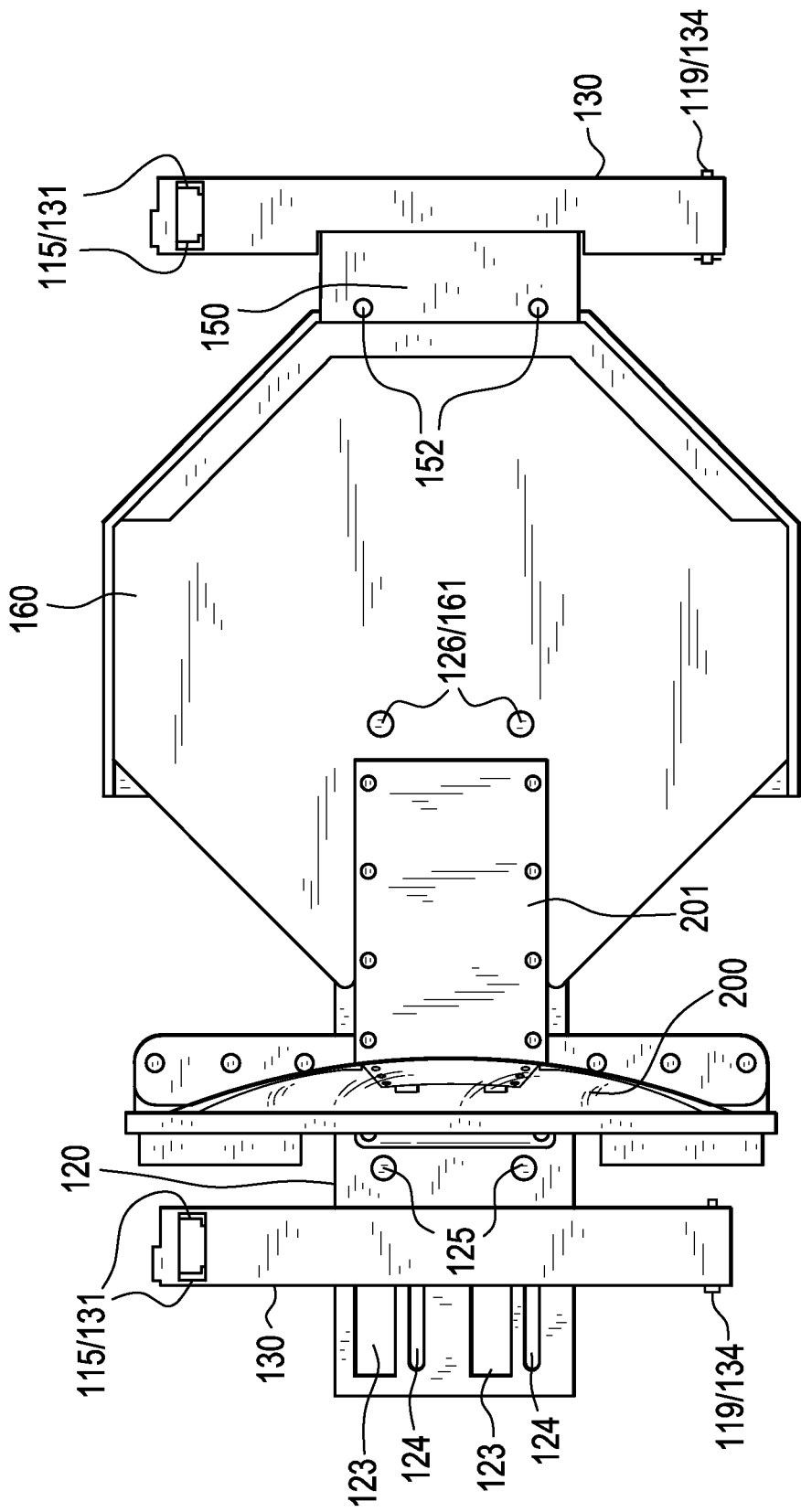
FIG. 9 is a front view of an exemplary mounting bracket assembly coupled to vehicle signage in an open position used in accordance with an embodiment of the present technology.
Figure 10:
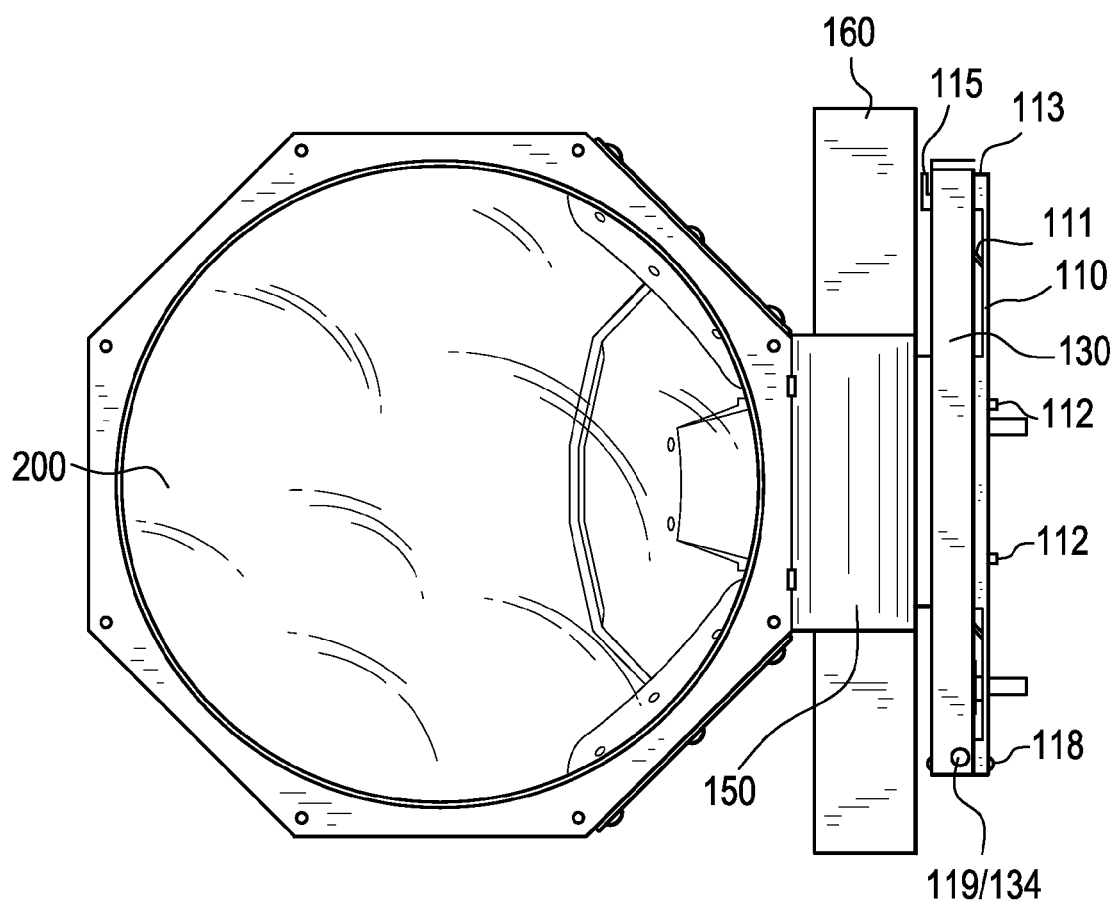
FIG. 10 is a side view of an exemplary mounting bracket assembly coupled to vehicle signage in an open position used in accordance with an embodiment of the present technology.

Vehicle signage 200, as illustrated in FIGS. 7-11, may be operably connected to mounting plate 120 at vehicle signage mounting holes 125 using bolts, screws, or any suitable attachment mechanism. For example, vehicle signage 200 may comprise a drive box 201 that attaches to mounting plate 120. The vehicle signage 200 may be a stop sign and/or mirror assembly, among other things. In various embodiments, drive box 201 may be configured to extend (as illustrated in FIGS. 8-11) and retract (as illustrated in FIG. 7) vehicle signage 200.

Referring to FIGS. 4A-4C, mounting bracket covers 130 comprise notch slots 131, cable slot 132, cable holes 133 and mounting bracket attachment holes 134. Mounting bracket covers 130 receive cables from the vehicle electronics system received at cable slot 132 and route the cables through cable holes 133 to the drive box 201 of vehicle signage 200. The cables may be secured within mounting bracket covers 130 using a cable tie, or any other suitable fastener attached to cable securing holes 116 of mounting brackets 110. The mounting bracket covers 130 provide a clean finish for the mounting bracket assembly 100 by covering the mounting brackets 110 after the mounting plate 120 is operably connected and secured to the mounting brackets 110. Mounting bracket covers 130 operably connect to the top portion 113 of the mounting brackets 110 by mating notches 115 of the mounting brackets with notch slots 131 of the mounting bracket covers 130. Further, the bottom portion 117 of the mounting brackets 110 are secured to the mounting bracket covers 130 by a pin, bolt, or any other suitable attachment mechanism, extending through mounting cover attachment holes 119 of mounting bracket 110 and mounting bracket attachment holes 134 of mounting bracket cover 130. The mounting brackets covers 130 may be metal, plastic, or any other suitable material.

Referring to FIG. 5, mounting bracket gaskets 140 comprise mounting plate attachment holes 141, a top portion 142 having a vehicle mounting hole 143, and a bottom portion 144 having a vehicle mounting hole 145. Mounting bracket gaskets 140 may be used between the mounting brackets 110 and the vehicle to minimize vibrations and prevent damage to the vehicle (e.g., paint damage, among other things). The mounting plate attachment holes 141 align with mounting plate attachment holes 112 of mounting brackets 110. The vehicle mounting hole 143 aligns with vehicle mounting hole 114 of mounting brackets 110. The vehicle mounting hole 145 aligns with vehicle mounting hole 118 of mounting brackets 110. Mounting bracket gaskets 140 may be rubber, foam or any other suitable material. In various embodiments, one or both sides of the mounting bracket gaskets 140 may comprise an adhesive for attaching to one or both of the mounting brackets 110 and the vehicle.

Referring to FIG. 6, bullet nose bracket 150 comprises mounting plate attachment holes 151 and wind guard attachment holes 152. The bullet nose bracket 150 along with wind guard 160 may protect vehicle signage 200 from damage from wind, tree limbs, debris and the like while the vehicle is moving and the vehicle signage 200 is in a closed position. The bullet nose bracket 150 is operably connected to mounting plate 120 by bolts, screws, or any suitable attachment mechanism, extending through mounting plate attachment holes 151 and bullet nose bracket mounting holes 127. The bullet nose bracket 150 may be generally J-shaped. For example, when connected to mounting plate 120, bullet nose bracket 150 extends toward a front of a vehicle and hooks back toward a rear of the vehicle such that the bullet nose bracket 150 would wrap around a side of wind guard 160 facing the front of the vehicle when the wind guard 160 is attached to mounting plate 120 (as illustrated in FIGS. 7-11). Although FIGS. 1 and 7-11 illustrate a mounting bracket assembly 100 configured for mounting on a passenger side of a vehicle, the mounting bracket assembly 100 may be mounted on either side of a vehicle.

Wind guard 160 is operably connected to mounting plate 120. In various embodiments, wind guard 160 is operably connected to mounting plate 120 using a bracket, such as a z-bracket or any other suitable bracket, as illustrated in FIG. 11. For example, bolts, screws, or any other suitable attachment mechanism, may extend through mounting plate attachment holes 161 and attach to the bracket. Further, bolts, screws, or any other suitable attachment mechanism, may extend through wind guard mounting holes 126 and attach to bracket. Bullet nose bracket 150 is operably connected to wind guard 160 by bolts, screws, or any suitable attachment mechanism, extending through wind guard attachment holes 152 and bullet nose bracket attachment holes (not shown). In various embodiments, wind guard 160 may be glass-filled plastic, metal, plastic, or any other suitable material. Bullet nose bracket 150 may be metal, plastic, or any other suitable material.

FIG. 7 is a perspective view of an exemplary mounting bracket assembly 100 coupled to vehicle signage 200 in a closed position. The mounting bracket assembly 100 coupled to vehicle signage 200 illustrated in FIG. 7 shares various characteristics with mounting bracket assembly 100 illustrated in FIGS. 1-6 as described above.

FIGS. 8-11 illustrate perspective, front, side and top views of an exemplary mounting bracket assembly 100 coupled to vehicle signage 200 in an open position. The mounting bracket assembly 100 coupled to vehicle signage 200 illustrated in FIGS. 8-11 shares various characteristics with mounting bracket assembly 100 illustrated in FIGS. 1-7 as described above.

Certain embodiments provide emergency release bracket systems 100 for use in connection with vehicle signage 200. The emergency release bracket system 100 includes a mounting bracket 110 for operably connecting to a vehicle. The mounting bracket 110 includes bent out tabs 111 and mounting plate attachment holes 112. The emergency release bracket system includes a mounting plate 120 for operably connecting to vehicle signage 200. The mounting plate 120 includes tab windows 121, 123 and tab slots 122, 124. The mounting plate 120 is adjustably and detachably coupled to the mounting bracket 110 by mating the tab windows 121, 123 of the mounting plate 120 with a portion of the bent out tabs 111 of the mounting bracket 110. The mounting plate 120 is secured to the mounting bracket 110 using removable couplings extending through the tab slots 122, 124 of the mounting plate 120 and the mounting plate attachment holes 112 of the mounting bracket 110.

In various embodiments, the emergency release bracket system 100 includes a mounting bracket gasket 140 for operably attaching between the mounting bracket 110 and the vehicle.

In certain embodiments, the mounting bracket 110 comprises two mounting brackets 110.

In various embodiments, the mounting plate 120 comprises a first end and a second end. A first portion 123, 124 of the plurality of tab windows 121, 123 and the plurality of tab slots 122, 124 is at the first end of the mounting plate 120. A second portion 121, 122 of the plurality of tab windows 121, 123 and the plurality of tab slots 122, 124 is at the second end of the mounting plate 120. The first portion 123, 124 of the plurality of tab windows 121, 123 and the plurality of tab slots 122, 124 at the first end of the mounting plate 120 comprise an extended width 123, 124 such that a distance between the two mounting brackets 110 is selectable.

In certain embodiments, the mounting plate 120 is coupled to the mounting bracket 110 at an adjustable height based on a selection of the portion of the plurality of bent out tabs 111 for mating with the plurality of tab windows 121, 123.

In various embodiments, the removable couplings are removable without using tools.

In certain embodiments, the emergency release bracket system 100 includes a bullet nose bracket 150 operably connected to the mounting plate 120, wherein the bullet nose bracket 150 is generally J-shaped.

In various embodiments, the emergency release bracket system 100 includes a wind guard 160 operably connected to the mounting plate 120.

In certain embodiments, the emergency release bracket system 100 includes vehicle signage 200 operably connected to the mounting plate 120.

In various embodiments, the vehicle signage 200 comprises at least one of a stop sign and a mirror assembly.

In certain embodiments, the vehicle signage 200 comprises a drive box 201 operable to extend and retract the at least one of the stop sign and the mirror assembly.

In various embodiments, the emergency release bracket system 100 includes a mounting bracket cover 130 operable to cover the mounting bracket 110 after the mounting plate 120 is coupled and secured to the mounting bracket 110.

In certain embodiments, the mounting bracket cover 130 comprises one or more of cable slots 132 and cable holes 133 for routing cables from a vehicle electronics system to vehicle signage 200.

In various embodiments, the mounting bracket 110 comprises a top portion 113 and a bottom portion 117, and wherein the mounting bracket cover 130 is detachably coupled 115/131, 119/134 at the top portion 113 and the bottom portion 117 of the mounting bracket 110.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. An emergency release bracket system comprising:
a mounting bracket operable to connect to a vehicle, the mounting bracket comprising:
a plurality of bent out tabs, and
a plurality of mounting plate attachment holes;
a mounting plate operable to connect to vehicle signage, the mounting plate comprising:
a plurality of tab windows, and
a plurality of tab slots; and
a mounting bracket gasket for operably attaching between the mounting bracket and the vehicle,
wherein the mounting plate is adjustably and detachably coupled to the mounting bracket by mating the plurality of tab windows of the mounting plate with a portion of the plurality of bent out tabs of the mounting bracket,
wherein the mounting plate is secured to the mounting bracket using removable couplings extending through the plurality of tab slots of the mounting plate and the plurality of mounting plate attachment holes of the mounting bracket.

2. An emergency release bracket system comprising:
a mounting bracket operable to connect to a vehicle, the mounting bracket comprising:
a plurality of bent out tabs, and
a plurality of mounting plate attachment holes; and
a mounting plate operable to connect to vehicle signage, the mounting plate comprising:
a plurality of tab windows, and
a plurality of tab slots,
wherein the mounting plate is adjustably and detachably coupled to the mounting bracket by mating the plurality of tab windows of the mounting plate with a portion of the plurality of bent out tabs of the mounting bracket,
wherein the mounting plate is secured to the mounting bracket using removable couplings extending through the plurality of tab slots of the mounting plate and the plurality of mounting plate attachment holes of the mounting bracket,
wherein the mounting bracket comprises two mounting brackets,
wherein:
the mounting plate comprises a first end and a second end,
a first portion of the plurality of tab windows and the plurality of tab slots is at the first end of the mounting plate,
a second portion of the plurality of tab windows and the plurality of tab slots is at the second end of the mounting plate, and
the first portion of the plurality of tab windows and the plurality of tab slots at the first end of the mounting plate comprise an extended width such that a distance between the two mounting brackets is selectable.

3. An emergency release bracket system comprising:
a mounting bracket operable to connect to a vehicle, the mounting bracket comprising:
a plurality of bent out tabs, and
a plurality of mounting plate attachment holes; and
a mounting plate operable to connect to vehicle signage, the mounting plate comprising:
a plurality of tab windows, and
a plurality of tab slots,
wherein the mounting plate is adjustably and detachably coupled to the mounting bracket by mating the plurality of tab windows of the mounting plate with a portion of the plurality of bent out tabs of the mounting bracket,
wherein the mounting plate is secured to the mounting bracket using removable couplings extending through the plurality of tab slots of the mounting plate and the plurality of mounting plate attachment holes of the mounting bracket,
wherein the mounting plate is coupled to the mounting bracket at an adjustable height based on a selection of the portion of the plurality of bent out tabs for mating with the plurality of tab windows.

4. The emergency release bracket system of claim 3, wherein the removable couplings are removable without using tools.

5. The emergency release bracket system of claim 1, comprising a bullet nose bracket operably connected to the mounting plate, wherein the bullet nose bracket is generally J-shaped.

6. The emergency release bracket system of claim 1, comprising a wind guard operably connected to the mounting plate.

7. The emergency release bracket system of claim 3, comprising vehicle signage operably connected to the mounting plate.

8. The emergency release bracket system of claim 7, wherein the vehicle signage comprises at least one of a stop sign and a mirror assembly.

9. The emergency release bracket system of claim 8, wherein the vehicle signage comprises a drive box operable to extend and retract the at least one of the stop sign and the mirror assembly.

10. An emergency release bracket system comprising:
a mounting bracket operable to connect to a vehicle, the mounting bracket comprising:
a plurality of bent out tabs, and
a plurality of mounting plate attachment holes; and
a mounting plate operable to connect to vehicle signage, the mounting plate comprising:
a plurality of tab windows, and
a plurality of tab slots; and
comprising a mounting bracket cover operable to cover the mounting bracket after the mounting plate is coupled and secured to the mounting bracket,
wherein the mounting plate is adjustably and detachably coupled to the mounting bracket by mating the plurality of tab windows of the mounting plate with a portion of the plurality of bent out tabs of the mounting bracket,
wherein the mounting plate is secured to the mounting bracket using removable couplings extending through the plurality of tab slots of the mounting plate and the plurality of mounting plate attachment holes of the mounting bracket.

11. The emergency release bracket system of claim 10, wherein the mounting bracket cover comprises at least one of cable slots and cable holes for routing cables from a vehicle electronics system to vehicle signage.

12. The emergency release bracket system of claim 10, wherein the mounting bracket comprises a top portion and a bottom portion, and wherein the mounting bracket cover is detachably coupled at the top portion and the bottom portion of the mounting bracket.

* * * * *